United States Patent
Ahn et al.

(10) Patent No.: US 9,065,113 B2
(45) Date of Patent: Jun. 23, 2015

(54) SECONDARY BATTERY WITH FILM COVERING SAFETY VENT

(75) Inventors: Byung-Kyu Ahn, Yongin-si (KR);
Yong-Sam Kim, Yongin-si (KR);
Sang-Won Byun, Yongin-si (KR);
Sung-Bae Kim, Yongin-si (KR)

(73) Assignees: SAMSUNG SDI CO., LTD., Yongin-si, Gyeonggi-do (KR); ROBERT BOSCH GmbH, Stuttgart (DE)

( * ) Notice: Subject to any disclaimer, the term of this patent is extended or adjusted under 35 U.S.C. 154(b) by 714 days.

(21) Appl. No.: 12/926,211

(22) Filed: Nov. 2, 2010

(65) Prior Publication Data
US 2011/0287286 A1    Nov. 24, 2011

(30) Foreign Application Priority Data
May 20, 2010   (KR) .......................... 10-2010-0047649

(51) Int. Cl.
*H01M 2/12*   (2006.01)
*H01M 10/02*   (2006.01)

(52) U.S. Cl.
CPC .......... *H01M 2/1241* (2013.01); *H01M 2/1235* (2013.01); *H01M 10/02* (2013.01)

(58) Field of Classification Search
CPC .......................... H01M 2/1241; H01M 2/1235
USPC .............. 429/53, 56, 163, 179; 137/843, 855
See application file for complete search history.

(56) References Cited

U.S. PATENT DOCUMENTS

| | | | |
|---|---|---|---|
| 4,191,806 A * | 3/1980 | Levy | 429/56 |
| 5,436,089 A * | 7/1995 | Fedele | 429/156 |
| 6,159,631 A * | 12/2000 | Thompson et al. | 429/82 |
| 6,444,348 B1 * | 9/2002 | Saijo et al. | 429/53 |
| 2005/0151514 A1 | 7/2005 | Kozu et al. | |
| 2007/0154782 A1 * | 7/2007 | Cho et al. | 429/56 |
| 2007/0275295 A1 | 11/2007 | Ray et al. | |
| 2009/0159347 A1 | 6/2009 | Zhou et al. | |
| 2010/0032039 A1 * | 2/2010 | Nemoto et al. | 137/843 |
| 2010/0233520 A1 * | 9/2010 | Suzuki et al. | 429/56 |
| 2010/0323228 A1 * | 12/2010 | Okamoto et al. | 429/82 |

FOREIGN PATENT DOCUMENTS

| | | | |
|---|---|---|---|
| JP | 2003346762 A | * | 12/2003 |
| JP | 2005-142115 A | | 6/2005 |

(Continued)

OTHER PUBLICATIONS

European Search Report in EP 11154791.5-1227, dated Jun. 7, 2011 (Ahn, et al.).

(Continued)

*Primary Examiner* — Zachary Best
(74) *Attorney, Agent, or Firm* — Lee & Morse, P.C.

(57) ABSTRACT

A secondary battery includes a case configured to accommodate an electrode assembly, a safety vent on a first side of the case, and a film unit disposed on the first side of the case, the film unit including a first film unit covering at least a part of the safety vent, the first film unit including a break unit, and a second film unit extending from the first film unit, the second film unit being adhered to the case.

7 Claims, 8 Drawing Sheets

(56) References Cited

FOREIGN PATENT DOCUMENTS

| | | | |
|---|---|---|---|
| JP | 4386139 B1 | * | 12/2009 |
| KR | 10 2001-0013393 A | | 2/2001 |
| KR | 10-2004-0099525 A | | 12/2004 |
| KR | 10-2006-0011046 A | | 2/2006 |
| KR | 10-2008-0037862 A | | 5/2008 |
| WO | WO 2010/021211 A1 | | 2/2010 |
| WO | WO 2010021211 A1 | * | 2/2010 |

OTHER PUBLICATIONS

Korean Office Action in KR 10-2010-0047649, dated Aug. 25, 2011 (Ahn, et al.).

European Office action in EP 11 154 791.5-1227, dated May 10, 2012 (Ahn, et al.).

* cited by examiner

SECONDARY BATTERY WITH FILM COVERING SAFETY VENT

BACKGROUND

1. Field

Embodiments relate to secondary batteries.

2. Description of the Related Art

Unlike primary batteries, secondary batteries are rechargeable. Secondary batteries are widely used in high technology electronic equipments, e.g., cell phones, laptops, camcorders, cars, etc.

A secondary battery may include an electrode assembly and an electrolyte. The electrode assembly may include a positive electrode plate, a negative electrode plate, and a separator therebetween. The electrolyte may include lithium ions. The positive electrode plate and the negative electrode plate of the electrode assembly may each include an electrode tab that protrudes outside of the electrode assembly.

The electrode assembly is contained in a case, and an electrode terminal may be exposed outside of the case. The electrode tabs may externally protrude outside of the electrode assembly to electrically connect to the electrode terminal. The case may have, e.g., a cylindrical or quadrangle shape.

One side of the case may be open, so the electrode assembly may be inserted into the case via the open side to be contained in the case. Here, a cap plate may cover the open side of the case. The electrode terminal electrically connected to the electrode assembly may penetrate the cap plate to protrude outside the cap. The electrode terminal and the cap plate may be electrically insulated from each other.

SUMMARY

Embodiments are directed to a secondary battery, which substantially overcomes one or more of the problems due to the limitations and disadvantages of the related art.

It is therefore a feature of an embodiment to provide a secondary battery with a film unit that insulates a cap plate and prevents a foreign substance from being inserted into a safety vent.

At least one of the above and other features and advantages may be realized by providing a secondary battery, including a case configured to accommodate an electrode assembly, a safety vent on a first side of the case, and a film unit disposed on the first side of the case, the film unit including a first film unit covering at least a part of the safety vent, the first film unit including a break unit, and a second film unit extending from the first film unit, the second film unit being adhered to the case.

The electrode assembly may include at least one electrode terminal penetrating the first side of the case, and at least one hole corresponding to the at least one electrode terminal may be formed on the film unit.

The first film unit may be detachable from the case along the break unit.

The break unit may include at least one cutting-plane line formed on a part of an edge of the first film unit, and a connecting line may integrally connect the first and second film units.

The first film unit may have a rectangular shape, the break unit may be a cutting-plane line formed on at least a part of an edge of the first film unit, and at least another part of the edge of the first film unit may be integral with the second film unit.

The first film unit may have a triangular shape, the break unit may be a cutting-plane line formed on at least a part of an edge of the first film unit, and at least another part of the edge of the first film unit may be integral with the second film unit.

The break unit may be a break line formed on at least a part of an edge of the first film unit.

The first film unit may have a rectangular shape, the break unit may be a break line formed on at least a part of an edge of the first film unit, and at least another part of the edge of the first film unit may be integrally formed with the second film unit.

The break unit may be a cutting-plane line having at least a portion in a center region of the first film unit.

The break unit may be a break line having at least a portion in a center region of the first film unit.

The safety vent may be integral with the first side of the case.

The secondary battery may further include a cap plate on the first side of the case, the cap plate being between the case and the film unit.

The second film unit may extend to an edge of the side of the case where the safety vent is disposed.

A shape of the first film unit may correspond to a shape of the safety vent.

The film unit may include an insulating material. The second film unit may include an insulating material.

The film unit may include a transparent material. The first film unit may include a transparent material.

The break unit may include a notch having a thickness from about 20% to about 80% of a thickness of the film unit. A thickness of the film unit may be about 1 mm, and the notch may have a thickness of about 0.5 mm.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
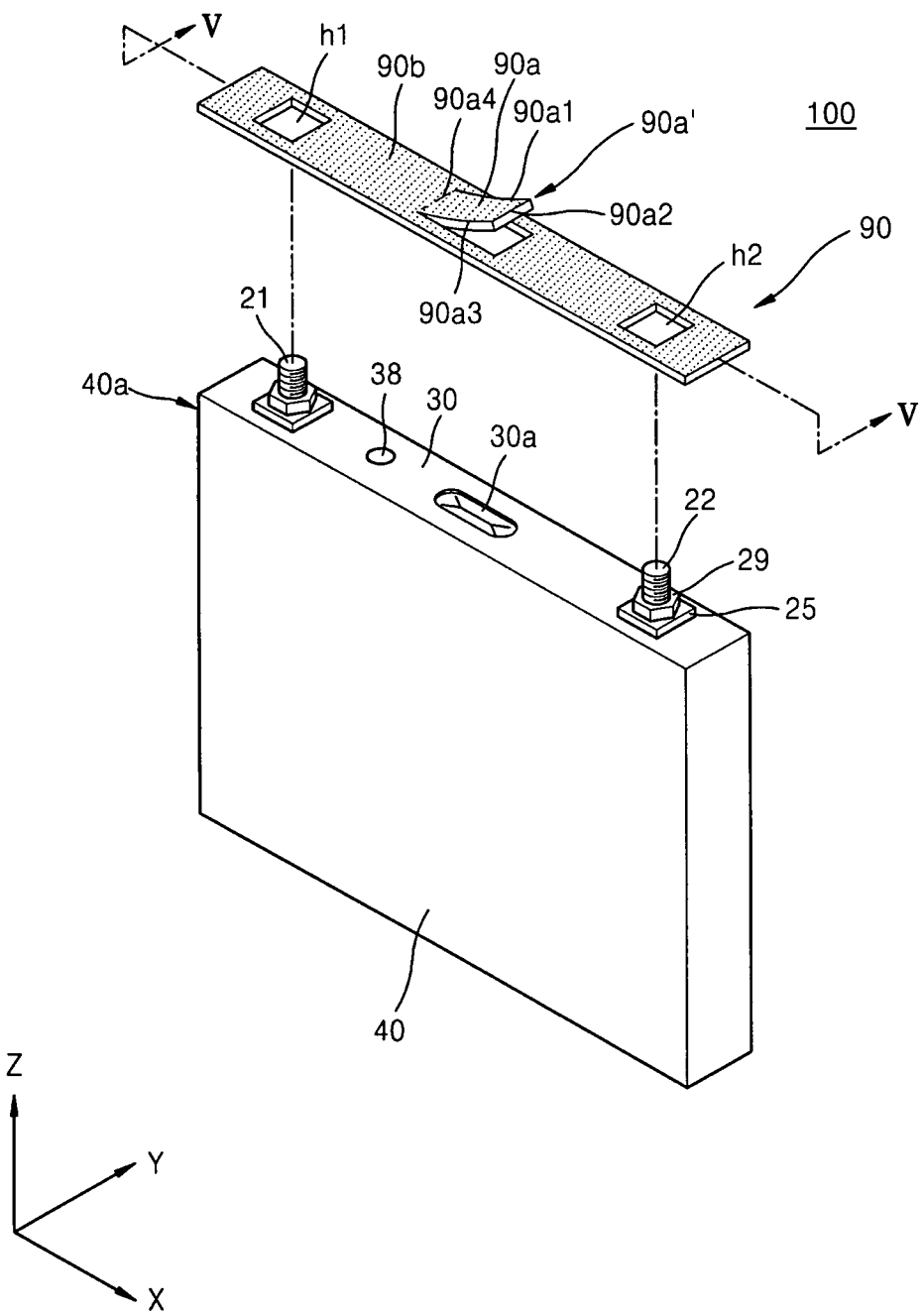
FIG. 1 illustrates a perspective schematic view of a secondary battery according to an embodiment.

Korean Patent Application No. 10-2010-0047649 filed on May 20, 2010, in the Korean Intellectual Property Office, and entitled: "Secondary battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Figure 2:
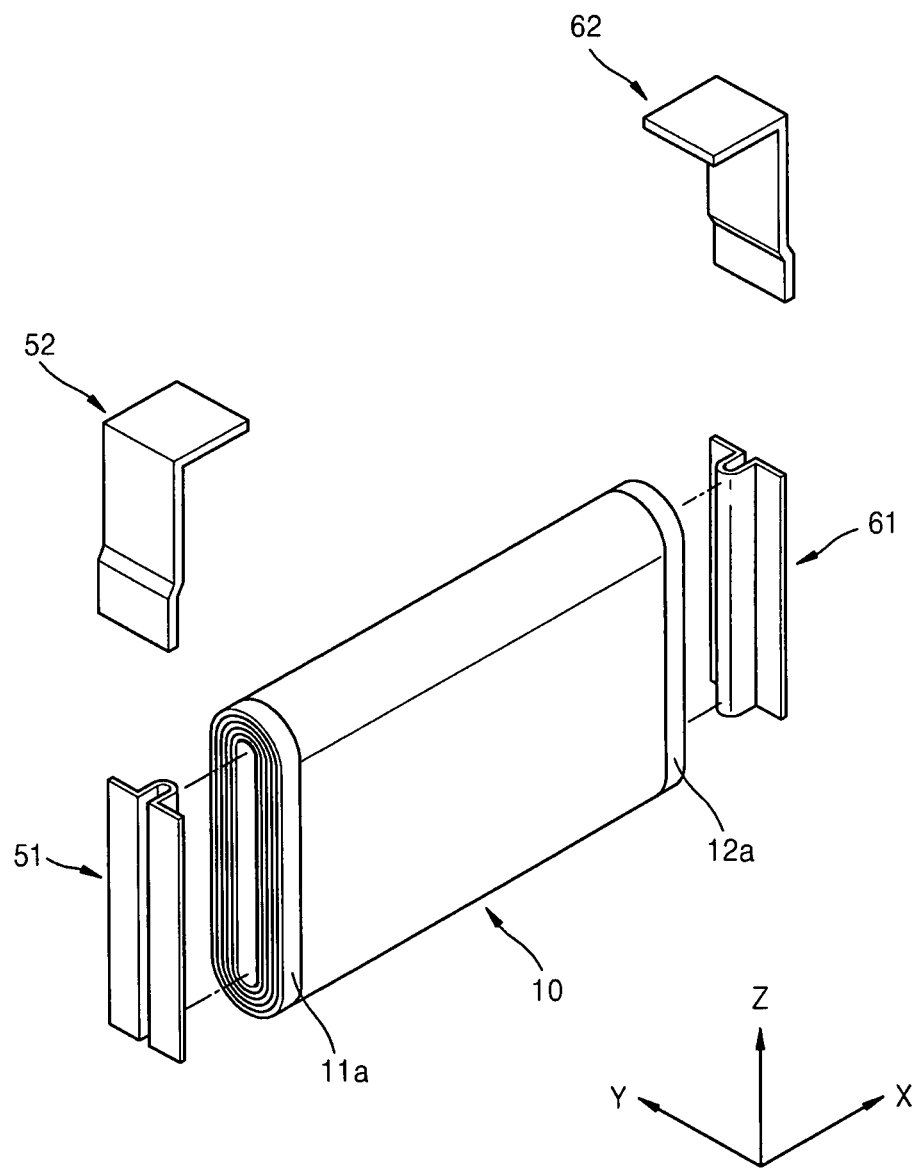
FIG. 2 illustrates a partial exploded perspective view of current collectors, lead members, and an electrode assembly in the secondary battery of FIG. 1.
Figure 3:
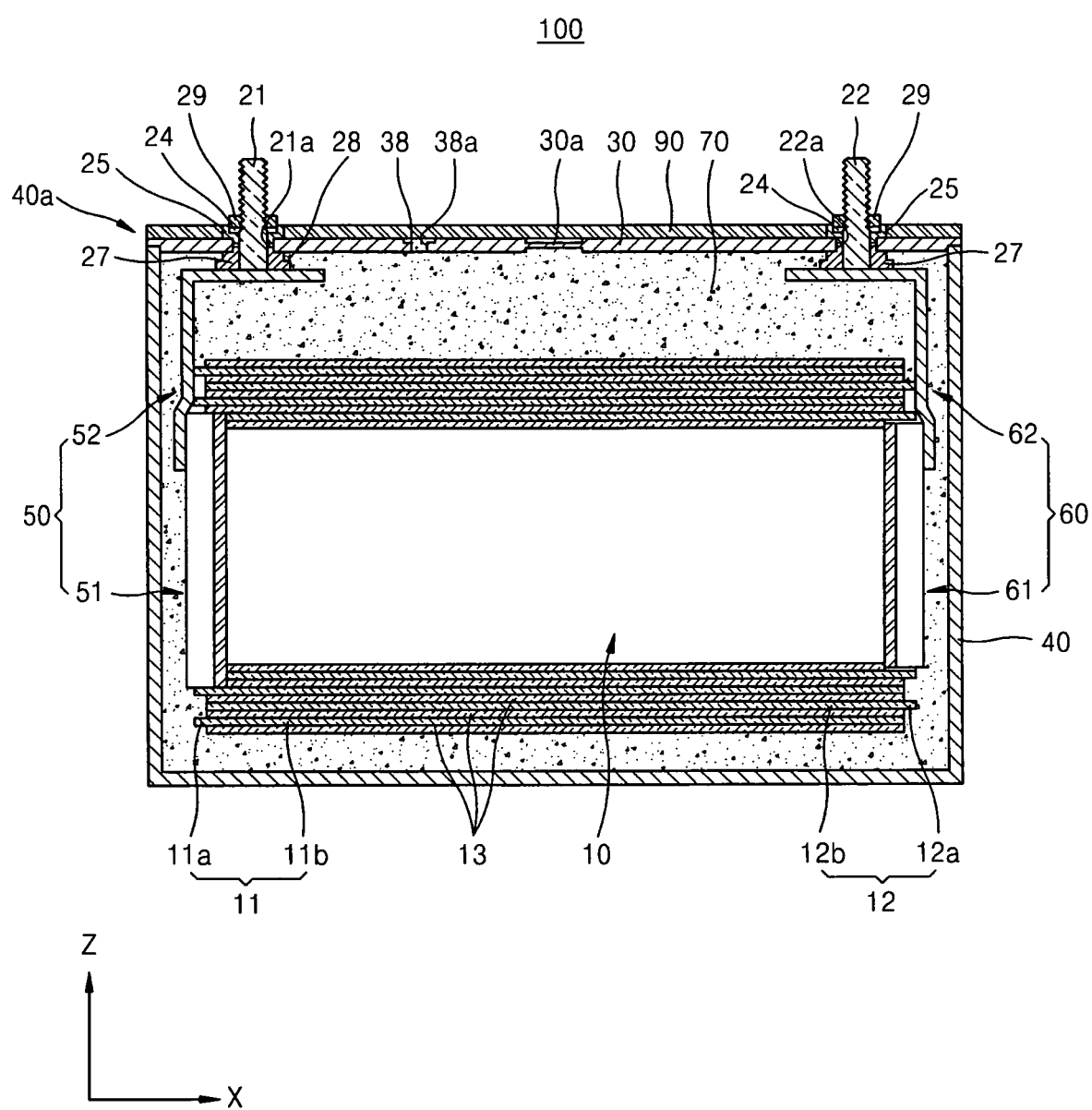
FIG. 3 illustrates a schematic cross-sectional view of FIG. 1.

FIG. 1 illustrates a schematic perspective view of a secondary battery 100 according to an embodiment. FIG. 2 illustrates a partial exploded perspective view of positive and negative electrode current collectors 51 and 61, positive and negative electrode lead members 52 and 62, and an electrode assembly 10 in the secondary battery 100 of FIG. 1. FIG. 3 illustrates a schematic cross-sectional view of FIG. 1.

Referring to FIGS. 1 through 3, the secondary battery 100 may include the electrode assembly 10, a cap plate 30, a case 40, and a film unit 90.

The secondary battery 100 according to the current embodiment is a lithium-ion secondary battery constituting a prismatic battery, but is not limited thereto. For example, the secondary battery 100 may be any of various types of batteries, e.g., a nickel-cadmium secondary battery, a nickel-hydrogen secondary battery, or a lithium battery, aside from a lithium-ion secondary battery. Also, a shape of the secondary battery 100 is not limited to a quadrangular shape, and the case 40 of the secondary battery 100 may have any of various shapes, e.g., a cylindrical shape.

The electrode assembly 10 may include a positive electrode 11, a negative electrode 12, and a separator 13. Positive and negative electrode current collecting units 50 and 60 may be electrically connected to the electrode assembly 10. The positive and negative electrode current collecting units 50 and 60 may be in the case 40.

The case 40 accommodates the electrode assembly 10 therein with an electrolyte 70. The cap plate 30 may be combined to an open side, e.g., a first side 40a, of the case 40, thereby sealing the case 40 containing the electrode assembly 10 and the electrolyte 70. Alternatively, six sides of the case 40 may be sealed without having to use the cap plate 30.

The positive electrode current collecting unit 50 may include the positive electrode current collector 51 and the positive electrode lead member 52. The positive electrode current collector 51 may be connected to the positive electrode 11 of the electrode assembly 10. One end of the positive electrode lead member 52 may be connected to the positive electrode current collector 51 and another end thereof may be connected to a positive electrode terminal 21. Similarly, the negative electrode current collecting unit 60 may include the negative electrode current collector 61 and the negative electrode lead member 62, and the negative electrode current collector 61 may be connected to the negative electrode 12. Both ends of the negative electrode lead member 62 may be respectively connected to the negative electrode current collector 61 and a negative electrode terminal 22. The positive electrode 11, the positive electrode current collector 51, and the positive electrode lead member 52, which are mutually electrically connected to each other, may include the same material, e.g., aluminum (Al). Also, the negative electrode 12, the negative electrode current collector 61, and the negative electrode lead member 62, which are mutually electrically connected to each other, may include the same material, e.g., copper (Cu). Here, such materials are not limited thereto, and may vary.

Upper and lower gaskets 25 and 27 may electrically separate the cap plate 30 from the positive and negative electrode terminals 21 and 22. Here, the upper and lower gaskets 25 and 27 block the electrolyte 70 so that the cap plate 30 and the positive and negative electrode terminals 21 and 22 may not be electrically shorted via the electrolyte 70.

The electrode assembly 10 may have a jelly roll shape where the positive electrode 11, the separator 13, and the negative electrode 12 are wound up. However, the electrode assembly 10 may have any of various shapes, e.g., the positive electrode 11, the separator 13, and the negative electrode 12 may be alternately stacked on each other.

The positive electrode terminal 21 may be electrically connected to the positive electrode current collecting unit 50, and a part of the positive electrode terminal 21 may be externally exposed through the cap plate 30. The negative electrode terminal 22 may be electrically connected to the negative electrode current collecting unit 60, and a part of the negative electrode terminal 22 may be externally exposed through the cap plate 30. As illustrated in FIGS. 1 and 3, the secondary battery 100 includes two electrode terminals, i.e., the positive and negative electrode terminals 21 and 22, but the current embodiment is not limited thereto. For example, one of the positive and negative electrode lead members 52 and 62 may be connected to the case 40 or the cap plate 30.

The electrode assembly 10 is wound up by disposing the separator 13 as an insulator between the positive electrode 11 and the negative electrode 12. The case 40 accommodates the electrode assembly 10 therein with the electrolyte 70. The positive electrode terminal 21 and the negative electrode terminal 22 are respectively electrically connected to the positive electrode 11 and the negative electrode 12 of the electrode assembly 10, and are exposed outside of the case 40. The cap plate 30 is connected to the open side of the case 40.

The positive electrode 11 may include a positive electrode plain unit 11a and a positive electrode coating unit 11b, and the negative electrode 12 may include a negative electrode plain unit 12a and a negative electrode coating unit 12b. The positive and negative electrode plain units 11a and 12a refer to respective areas on the positive and negative electrode current collectors 51 and 61, e.g., which are formed of thin metal foils, where an active material is not coated. The positive and negative electrode coating units 11b and 12b refer to respective areas on the positive and negative electrode current collectors 51 and 61 where an active material is coated. The positive electrode plain unit 11a may be formed on one side end of the positive electrode 11 along a length direction of the positive electrode 11 on one side end of the electrode assembly 10. The negative electrode plain unit 12a may be formed on one side end of the negative electrode 12 along a length direction of the negative electrode 12 on another side end of the electrode assembly 10.

The case 40 may be shaped, e.g., as a quadrangular can having an open side. The electrode assembly 10 and the electrolyte 70 may be accommodated in the case 40 via the open side of the case 40. The cap plate 30 covers the case 40 in such a way that the positive and negative electrode terminals 21 and 22 protrude externally with respect to the cap plate 30. A boundary between the case 40 and the cap plate 30 may be sealed. For example, the case 40 and the cap plate 30 may be welded by a laser, thereby sealing the case 40 accommodating the electrode assembly 10 and the electrolyte 70.

The cap plate 30 may be formed of a thin plate. An electrolyte inlet 38a for injecting the electrolyte 70 may be formed in the cap plate 30. After the electrolyte 70 is injected through the electrolyte inlet 38a, a sealing cap 38 may be inserted into the electrolyte inlet 38a.

Positive and negative electrode terminal holes 21a and 22a may be formed in the cap plate 30, e.g., through the cap plate 30. The positive electrode terminal 21 may externally protrude through the positive electrode terminal hole 21a, and the negative electrode terminal 22 may externally protrude through the negative electrode terminal hole 22a.

The upper and lower gaskets 25 and 27 may be disposed between the cap plate 30 and the positive and negative electrode terminals 21 and 22, thereby insulating the cap plate 30 from each of the positive and negative electrode terminals 21 and 22. The lower gaskets 27 are inserted below the cap plate 30 through the positive and negative electrode terminal holes 21a and 22a, and the upper gaskets 25 are inserted above the cap plate 30. A washer 24 for buffering a clamping force may be installed on each of the upper gaskets 25. A screw thread may be formed on each of the positive and negative electrode terminals 21 and 22, and the positive and negative electrode terminals 21 and 22 may be respectively coupled to nuts 29 with the washers 24 therebetween. The nuts 29 support the positive and negative electrode terminals 21 and 22.

Alternatively, the positive and negative electrode terminals 21 and 22 may be formed as a rivet type. In this case, parts of the positive and negative electrode terminals 21 and 22 externally protrude through the positive and negative electrode terminal holes 21a and 22a, respectively, and the positive and negative electrode terminals 21 and 22 may be fixed to the cap plate 30 by pressurizing the externally protruded parts of the positive and negative electrode terminals 21 and 22 to widely spread out. The upper gaskets 25 are inserted between the positive and negative electrode terminal holes 21a and 22a and the externally protruded parts of the positive and negative electrode terminals 21 and 22.

A structure of the secondary battery 100 has been described above, but the structure is only an embodiment, and the secondary battery 100 may have any of various structures. For example, although not illustrated in FIGS. 1 through 3, the electrode assembly 10 may include a center pin. Alternatively, the electrode assembly 10 may extend along, e.g., a Z-axis, instead of an X-axis as shown in FIG. 3. In yet another alternative, at least one of the positive and negative electrode terminals 21 and 22 may be connected to the case 40. A composition of the secondary battery 100 is not limited to the current embodiment and may vary.

Figure 4A:
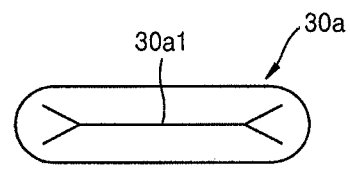
FIGS. 4A and 4B illustrate schematic diagrams of a safety vent before and after being opened, respectively.
Figure 4B:
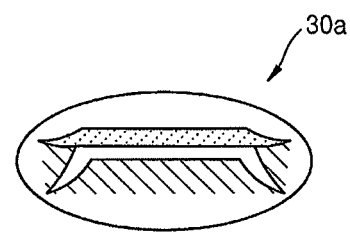

A safety vent 30a will now be described. The safety vent 30a may be formed by modifying a part of the cap plate 30 or disposing a separate element on the cap plate 30. For example, referring to FIG. 3, the safety vent 30a may be integrally formed on the cap plate 30, and may be thinner than the cap plate 30 along the Z-axis. As such, the safety vent 30a may break according to an internal pressure set in the cap plate 30. However, the safety vent 30a may have a different structure. The safety vent 30a will be described in detail with reference to FIGS. 4A and 4B. FIGS. 4A and 4B are diagrams schematically illustrating the safety vent 30a before and after being opened, respectively.

Referring to FIG. 4A, a vent break line 30a1 is formed on the safety vent 30a, so that the safety vent 30a may be easily broken according to an internal pressure of the case 40. As illustrated in FIG. 4A, the vent break line 30a1 is sealed when the safety vent 30a is closed, i.e., before the safety vent 30a breaks.

Referring to FIG. 4B, when the internal pressure of the case 40 increases, the safety vent 30a may be torn along the vent break line 30a1. Here, the safety vent 30a is torn before the internal pressure of the case 40 reaches a high pressure that is sufficient to tear the cap plate 30 or the case 40. Thus, an internal gas may be externally discharged, thereby preventing the secondary battery 100 from exploding.

The film unit 90 will now be described. As shown in FIG. 1, the film unit 90 may be disposed on one side of the case 40, e.g., on the first side 40a of the case 40. Since the cap plate 30 is on the first side 40a of the case 40, the film unit 90 may be disposed on the cap plate 30, e.g., on a surface of the cap plate 30 facing away from the electrode assembly 10. Referring to FIG. 1, the film unit 90 may include a first film unit 90a and a second film unit 90b. For example, the first and second film units 90a and 90b may be integral with each other and substantially coplanar, and the second film unit 90b may surround, e.g., completely surround a perimeter of, the first film unit 90a. The first film unit 90a may be disposed on one side of the case 40 or on the cap plate 30, and may cover, e.g., overlap, at least a part of the safety vent 30a. The second film unit 90b may extend from the first film unit 90a. For example, the film unit 90 may cover the entire open side of the case 40.

The first film unit 90a may prevent foreign substances from entering the safety vent 30a. Accordingly, the first film unit 90a may cover at least a part of the safety vent 30a. A break unit 90a' may be formed on an edge of or on an inner part of the first film unit 90a, so as to form a path for the internal gas of the case 40 to pass through after the safety vent 30a is torn. In other words, the first film unit 90a may be positioned on the safety vent 30a to cover at least a part of the safety vent 30a, and at least a portion thereof may separate from, e.g., extend away from, the safety vent 30a via the break unit 90a' to enable gas release from an open safety vent 30a.

Figure 5:
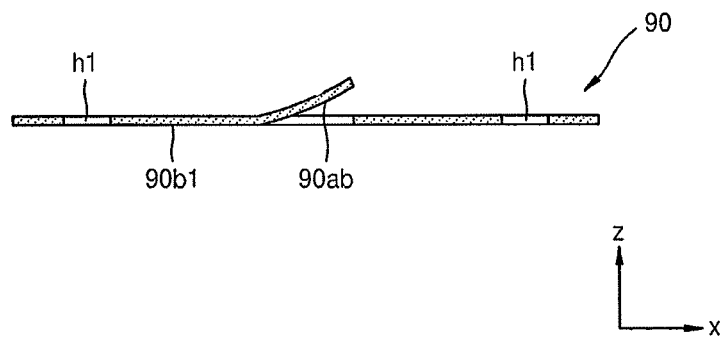
FIG. 5 illustrates a schematic cross-sectional view taken along line V-V of FIG. 1.

FIG. 5 illustrates a schematic cross-sectional view of the film unit 90 along line V-V of FIG. 1. Referring to FIG. 5, it is noted that an adhesive material may be applied only to the second film unit 90b, i.e., an adhesive material may not be adhered to an inner side 90a b of the first film unit 90a facing the cap plate 30. If adhesive is applied to the inner side 90ab of the first film unit 90a, i.e., if the first film unit 90a is adhered to the safety vent 30a, the first film unit 90a may scatter away from the film unit 90 during opening of the safety vent 30a due to an explosion, or the like. As such, if the first film unit 90a is separated and scattered from the film unit 90, safety may be decreased. Accordingly, an adhesive material may not be disposed between the first film unit 90a and the safety vent 30a, so the first film unit 90a may be prevented from being torn and scattered by sliding away from the safety vent 30a even when the safety vent 30a is opened due to an explosion, or the like.

As illustrated in FIGS. 1 and 5, the break unit 90a' may be formed along an edge of or inside of the first film unit 90a, so that a part of the first film unit 90a may be easily separated from, i.e., detached from, the second film unit 90b or the safety vent 30a. As such, the gas emitted through the safety vent 30a may discharge through the partially opened first film unit 90a. For example, as illustrated in FIG. 1, the break unit 90a' may include three cutting-plane lines 90a1, 90a2, and 90a3 of the first film unit 90a separated from the second film unit 90b. In such a structure, the first film unit 90a may easily extend away from the second film unit 90b and the case 40 along the break unit 90a' when gas is discharged through the safety vent 30a.

The break unit 90a' may be a cutting-plane line and/or a break line. The cutting plane line refers to a cut part penetrating through the first film unit 90a and completely separating the first film unit 90a from the second film unit 90b before and after the safety vent 30a opening. The break line refers to a punch dotted line at regular intervals penetrating the first film unit 90a and surrounding at least a part of the first film unit 90a, e.g., the first film unit 90a is only partially separated from the second film unit 90b before opening of the safety vent 30a. Alternatively, the break line may be a thin line that is easily cut or broken at regular intervals, e.g., without completely penetrating through the first film unit 90a, so the first film unit 90a may completely separate from the second film unit 90b through the break line only when the safety vent 30a is open. The break line is shown as a dotted line in the drawings (FIGS. 7A-8A), but may be a continuous line. In other words, a thickness of the break line, e.g., along the Z-axis, formed around the first film unit 90a may be relatively thin for easier cutting or tear-off according to an external pressure. For example, the thickness of the film unit 90 may be about 1 mm, and the break line may form a notch of about 0.5 mm in the film unit 90. Here, a thickness of the notch of the break line may be about 20% to about 80% of the thickness of the film unit 90. However, the shape and configuration of the break unit are not limited thereto, and may vary. For example, a connection between the first film unit 90a and the second film unit 90b may be loosened, e.g., a connector (not shown) for connecting the first film unit 90a and the second film unit 90b may be formed of a material that is easily breakable. However, the break unit is not limited thereto.

Referring to FIG. 1, the cutting-plane lines 90a1, 90a2, and 90a3 may be formed along edges of the first film unit 90a, and the first film unit 90a may be connected to the second film unit 90b through the connecting side 90a4. For example, the cutting-plane lines 90a1, 90a2 and 90a3, and the connecting side 90a4 may be arranged, so the shape of the first film unit 90a may correspond to the shape of the safety vent 30a. Here, in order to easily determine a state of the safety vent 30a, i.e., open or closed, the first film unit 90a may be formed of a transparent material. In other words, as the state of the safety vent 30a may be determined through the first film unit 90a, the state of the safety vent 30a may be determined without having to remove the first film unit 90a. Here, not only the first film unit 90a, but also all parts of the second film unit 90b may be formed of a transparent material.

Referring to FIG. 5, at least a part of an inner side 90b1 of the second film unit 90b may include an adhesive material so as to adhere the second film unit 90b to a side of the case 40 or a side of the cap plate 30. Here, the second film unit 90b may insulate the cap plate 30. In other words, the second film unit 90b may include an insulating material. Here, the insulating material may not only be included in the second film unit 90b, but may also be included in, e.g., all parts of or some parts of, the first film unit 90a. The second film unit 90b may extend to an edge of the cap plate 30. Also, as shown in FIG. 1, holes h1 and h2 respectively corresponding to the positive and negative electrode terminals 21 and 22 extending from the electrode assembly 10 may be formed in the film unit 90, i.e., through the second film unit 90b. Second film units 190b, 290b, 390b, 490b, 590b, 690b, 790b, 890b, 990b, 1090b, 1190b, and 1290b illustrated in FIGS. 6A through 8B may perform the same or similar functions as the second film unit 90b of FIG. 1, unless otherwise described.

As described above, a secondary battery according to example embodiments may include integrated first and second film units 90a and 90b in a single film unit 90 on the cap plate 30, so separate cap plate protecting film and vent protecting film may not be required. In other words, when a conventional cap plate protecting film is attached to one side of a cap plate for insulation and a conventional vent protecting film is attached to a safety vent to prevent foreign substance penetration, the cap plate protecting film and the vent protecting film need to be separately produced and attached respectively to the cap plate and the safety vent. However, according to the current embodiment, the film unit 90 may be formed by integrating the first film unit 90a, which operates as a vent protecting film, and the second film unit 90b, which operates as a cap plate protecting film, thereby improving process efficiency.

The shape and size of the first film unit 90a may be variously adjusted. Also, the first film unit 90a may have any combination of a cutting-plane line and a break line. Different configurations of the film unit 90 will now be described in detail with reference to FIGS. 6A through 8B. FIGS. 6A through 6F illustrate various modified examples of the film unit 90 of FIG. 1, FIGS. 7A through 7D illustrate other various modified examples of the film unit 90 of FIG. 1, and FIGS. 8A through 8B illustrate yet other various modified examples of the film unit 90 of FIG. 1.

Figure 6A:
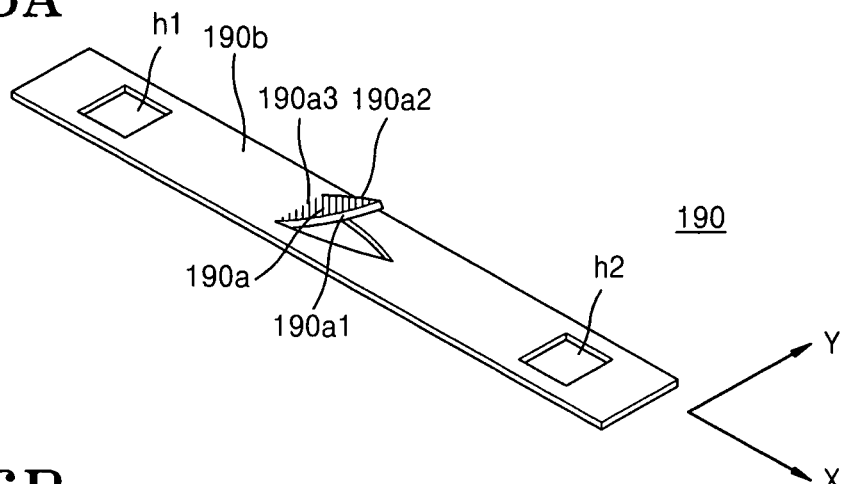
FIGS. 6A through 6F illustrate various modified examples of a film unit of FIG. 1.

Referring to FIG. 6A, a first film unit 190a may have a triangular shape, as viewed from a plan view. In detail, cutting-plane lines 190a1 and 190a2 may be formed on at least a part of at least one side of the first film unit 190a and another side 190a3 of the first film unit 190a may be connected to the second film unit 190b.

Figure 6B:
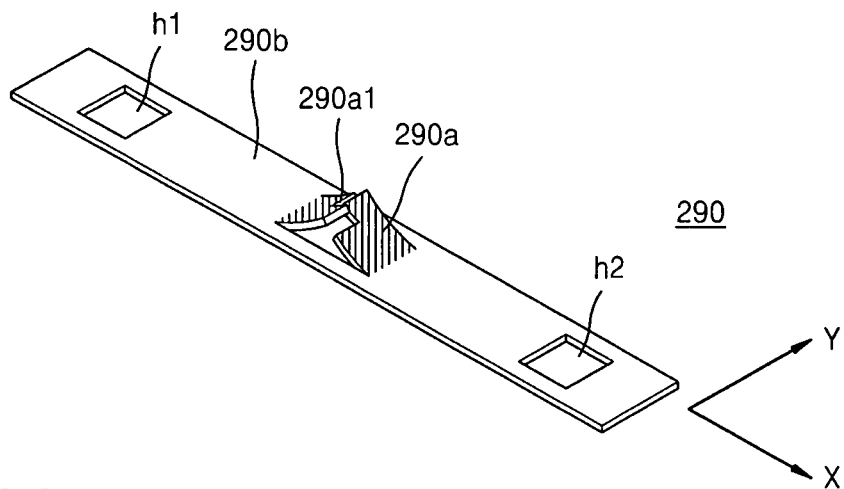

Referring to FIG. 6B, an irregular cutting-plane line 290a1 may be formed inside a first film unit 290a. For example, the irregular cutting-plane line 290a1 may divide the first film unit 290a into two separate parts. Thus, gas may easily be discharged from the safety vent 30a through the irregular cutting-plane line 290a1, i.e., between the two parts of the first film unit 290a. Also, the first film unit 290a may not be separated and scatted from the second film unit 290b according to a shape of the irregular cutting-plane line 290a1 in the first film unit 290a. For example, when the cutting-plane line 290a1 is disposed in a center of the first film unit 290a and gas in the case 40 is released, the first film unit 290a may be opened via the cutting-plane line 290a1 in the center to discharge the gas.

Referring to FIGS. 6C through 6F, first film units 390a, 490a, 590a, and 690a may have a rectangular shape, and a cutting-plane lines may be formed on at least a part of an edge of or inside of the first film units 390a, 490a, 590a, and 690a.

Figure 6C:
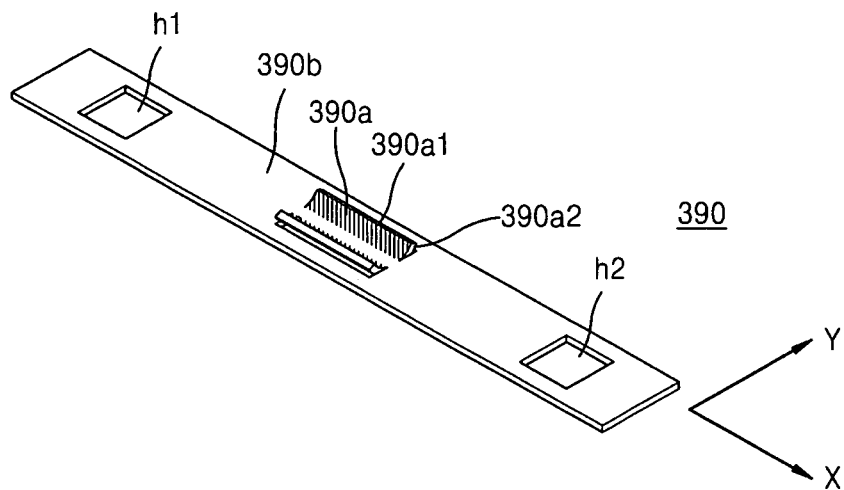

For example, referring to FIG. 6C, a full cutting-plane line 390a1 along the x-axis and a partial cutting-plane line 390a2 along the y-axis may be formed on four sides of the first film unit 390a. A linear portion of the second film unit 390b may extend through a center of the first film unit 390a along the x-axis.

Figure 6D:
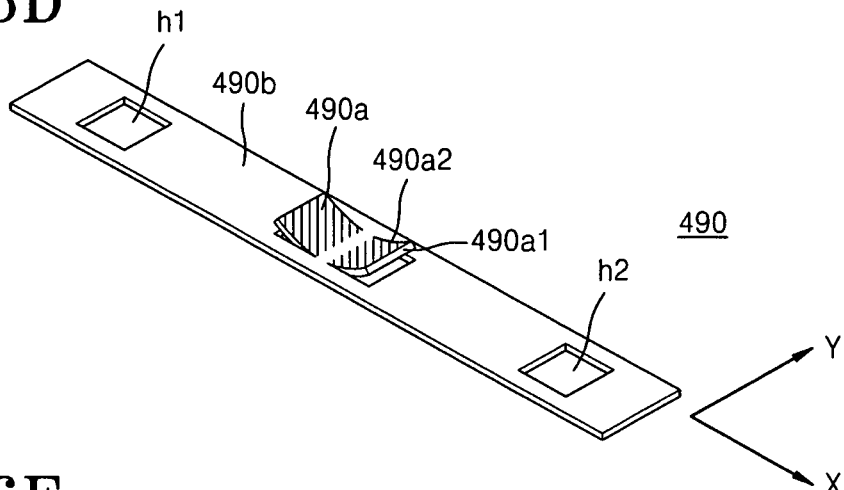

In another example, the film unit 490 of FIG. 6D is similar to the film unit 390 of FIG. 6C, with the exception of having a full cutting-plane line 490a1 along the y-axis and a partial cutting-plane line 490a2 along the x-axis. A linear portion of the second film unit 490b may extend through a center of the first film unit 490a along the y-axis.

Figure 6E:
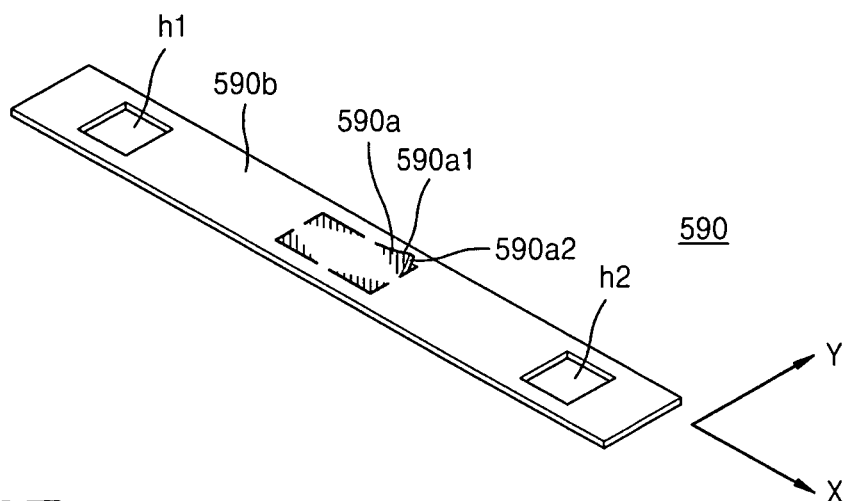

In yet another example, as illustrated in FIG. 6E, partial cutting-plane lines 590a1 and 590a2 may be formed around the first film unit 590a to form a gas discharge path. For example, four portions of the first film unit 590a may define edges of a rectangle including a portion of the second film unit 590b in a center thereof.

Figure 6F:
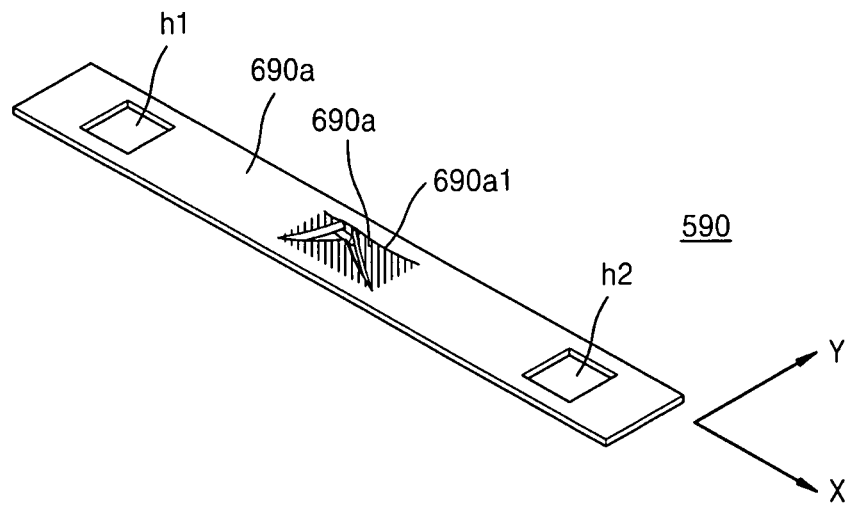

In still another example, as illustrated in FIG. 6F, cutting-plane lines 690a1 may be formed inside the first film unit 690a to form a gas discharge path. Here, the number of the cutting-plane lines 690a1 in FIG. 6F is four, but is not limited thereto, and may be less than or more than four.

Referring to FIGS. 7A through 7D, a break line may be formed on at least a part of an edge of or inside each of first film units 790a, 890a, 990a, and 1090a.

Figure 7A:
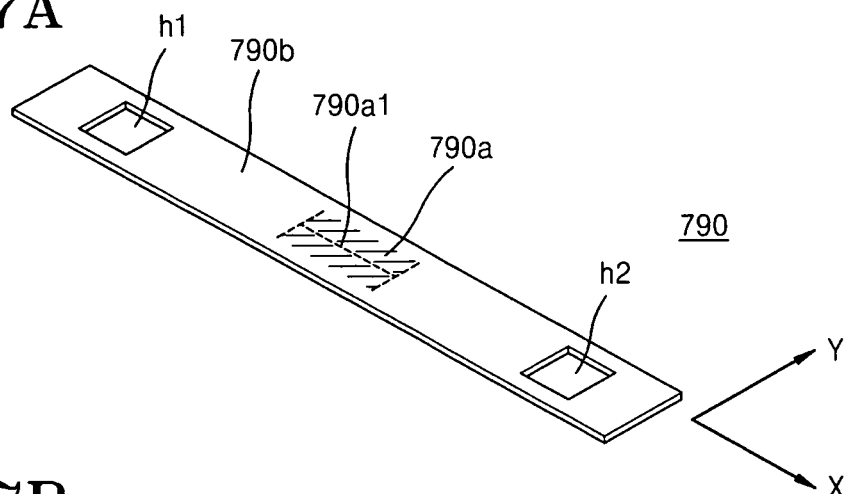
FIGS. 7A through 7D illustrate other various modified examples of the film unit of FIG. 1.
Figure 7B:
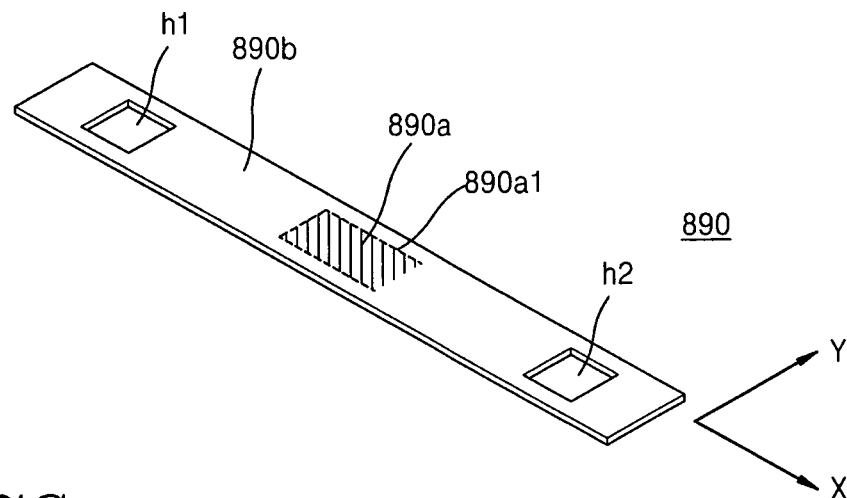
Figure 7C:
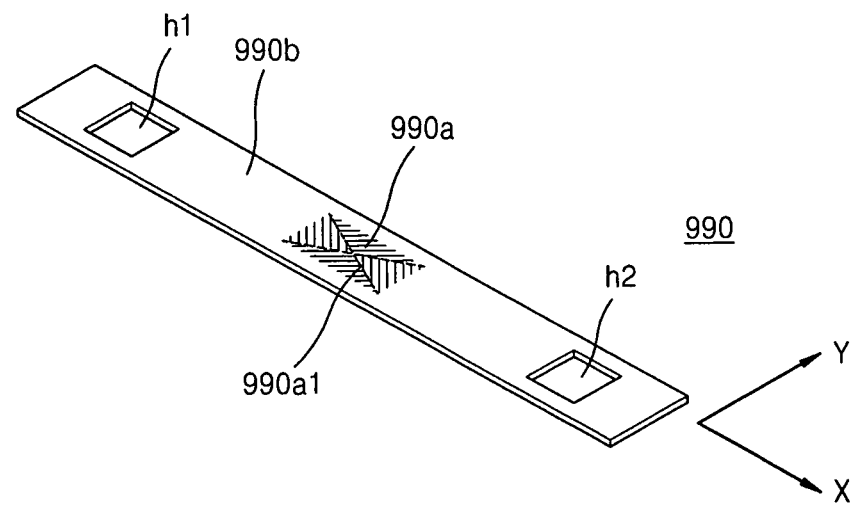
Figure 7D:
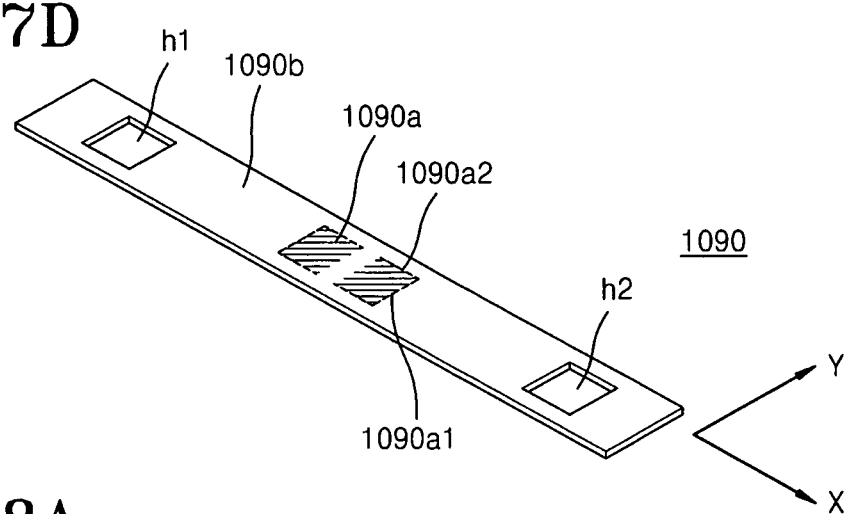
Figure 8A:
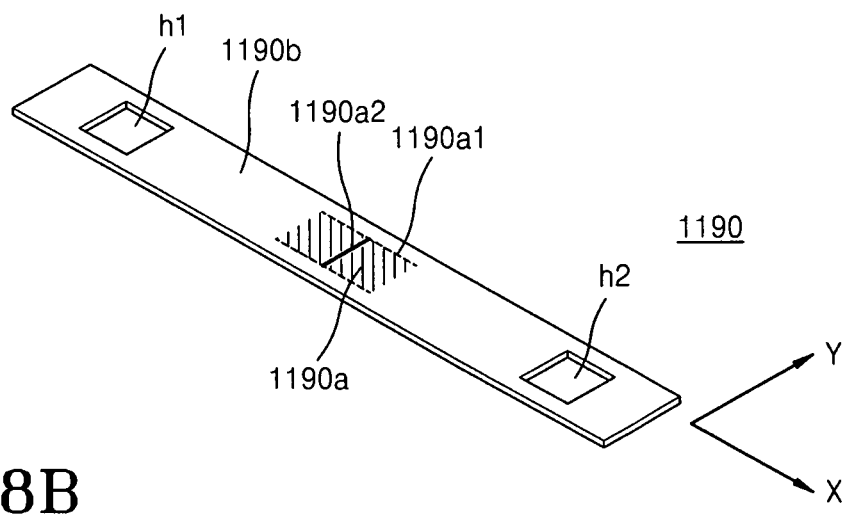
FIGS. 8A through 8B illustrate other various modified examples of the film unit of FIG. 1.
Figure 8B:
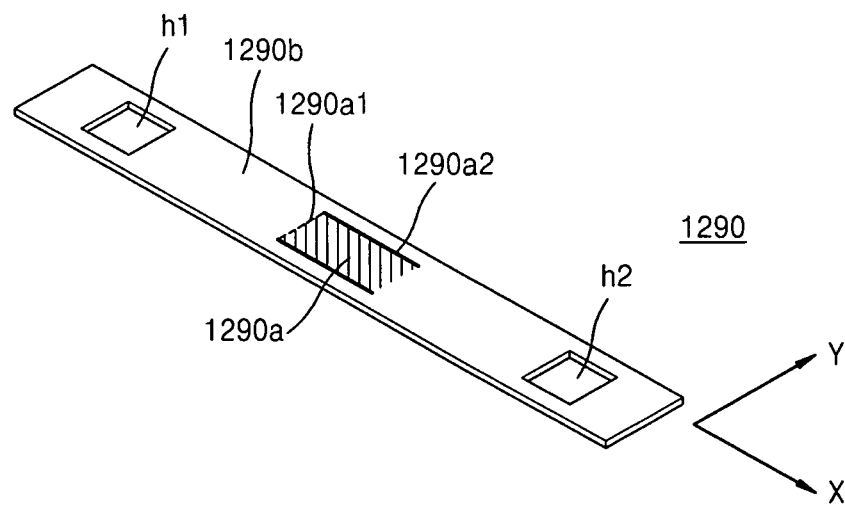

Referring to FIG. 7A, the first film unit 790a may have a rectangular plane, and a break line 790a1 may be formed on at least a part of two sides and/or inside the first film unit 790a. Here, the break line 790a1 may have a notch shape. Alternatively, as shown in FIG. 7B, a break line 890a1 may be formed around three sides of the first film unit 890a. Although not illustrated in FIG. 7B, the break line 890a1 may be formed on any one of the four sides of the first film unit 890a. A shape of the first film unit 890a is not limited to the rectangular plane, and may vary, e.g., a triangular plane, a pentagonal plane, a circular plane, or a star shaped plane. Referring to FIG. 7C, a break line 990a1 may be formed inside the first film unit 990a. Referring to FIG. 7D, a break line 1090a1 may be formed on the entire side of an edge of the first film unit 1090a and/or a partial break line 1090a2 may be formed on an edge of the first film unit 1090a.

Alternatively, a cutting-plane line or a break line may be both formed on each of the first film units 1190a and 1290a as shown in FIGS. 8A and 8B. Referring to FIG. 8A, a cutting-plane line 1190a2 may be formed inside the first film unit 1190a and a break line 1190a1 may be formed on an edge of the first film unit 1190a. Alternatively, referring to FIG. 8B, a break line 1290a1 may be formed on one side of an edge of the first film unit 1290a and cutting-plane lines 1290a2 may be formed on other two sides of the edge of the first film unit 1290a. Here, combinations of the cutting-plane line and the break line is not limited thereto, and may vary.

As described above, according to the one or more of the above embodiments, efficiency of a secondary battery preparing process may be increased by insulating a cap plate and providing an integrated film unit for preventing a foreign substance from being penetrated into a safety vent.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery, comprising:
a case configured to accommodate an electrode assembly;
a cap plate sealing the case;
a safety vent in the cap plate, the safety vent being integral with the cap plate and having a thickness smaller than a thickness of the cap plate; and
a film unit disposed directly on the cap plate, the film unit including:
a first film unit covering the safety vent and consisting of transparent material, the first film unit including a break line, the first film unit being detachable from the case along the break line, the break line being a punch dotted line at regular intervals penetrating and surrounding at least a part of the first film unit,
a second film unit extending from the first film unit, the second film unit being adhered to the case, and
an adhesive material on the second film unit, the adhesive material being on a surface of the second film unit facing the cap plate, and no adhesive material being on a surface of the first film unit facing the safety vent.

2. The secondary battery as claimed in claim 1, wherein:
the electrode assembly includes at least one electrode terminal penetrating the cap plate, and
the film unit includes at least one hole corresponding to the at least one electrode terminal.

3. The secondary battery as claimed in claim 1, wherein the cap plate is a single layer.

4. The secondary battery as claimed in 3, wherein the cap plate is between the case and the film unit.

5. The secondary battery as claimed in claim 1, wherein the second film unit extends to an edge of the cap plate.

6. The secondary battery as claimed in claim 1, wherein the film unit includes an insulating material.

7. The secondary battery as claimed in claim 6, wherein the second film unit includes an insulating material.

* * * * *